United States Patent Office 3,696,043
Patented Oct. 3, 1972

3,696,043
CLEANING COMPOSITION FOR GLASS AND REFLECTIVE SURFACES
Robert G. Labarge, Syamalarao Evani, and Alden W. Hanson, Midland, Mich., assignors to The Dow Chemical Company, Midland, Mich.
No Drawing. Filed Oct. 21, 1970, Ser. No. 82,815
Int. Cl. C09k 3/18; C11d 3/30
U.S. Cl. 252—153
8 Claims

ABSTRACT OF THE DISCLOSURE

The incorporation of a water soluble polymeric salt, such as the neutralization product of diethanol amine with an equimolar copolymer of styrene-maleic acid, in an aqueous surfactant cleaning formulation for glass and reflective surfaces improves the formulations by decreasing the streaking and enhancing the antifog characteristics.

BACKGROUND OF THE INVENTION

The concept of providing antifog characteristics to cleaning formulations for glass, mirrors and various reflective surfaces has been mentioned numerous times in the literature.

Desirably the surfactant employed provides both good cleaning and antifog properties. One of the better classes of surfactants which provide both properties is the sulfonated surfactants; however, they also streak quite badly which greatly detracts from their usefulness. Other antifogging materials which have been suggested are alkanol amide, glycerine and silicones. Either these products do not eliminate the streaking problem or else they are economically unattractive for low cost consumer products. The silicones, which are good antifog agents, find application in specialty products of this type where a higher price is possible. Generally these antifog materials are wetting agents or humectants which function merely by dissolving in the water droplet and causing the water to spread as a film rather than remain as a droplet. However, humectants leave an undesirable "greasy," dust attracting surface.

Typical of the art are: U.S. 3,441,510 which describes an aqueous lower alkyl amide solution; U.S. 3,463,735 which discloses an alcohol-glycol solvent cleaner containing a surfactant and an alkali metal polyphosphate; U.S. 3,342,740 which discloses an aqueous solution of a surfactant, a lower alcohol and a silicone glycol; U.S. 3,304,-264 is related to a car windshield cleaner (aqueous) containing a lower alcohol and an ammonium salt of a sulfonate surfactant; U.S. 3,251,779 and U.S. 3,309,321. Additionally attempts have been made to put a permanent nonfogging coating over a glass surface such as in U.S. 3,488,215.

SUMMARY OF THE INVENTION

This invention is directed to improved cleaner formulations which decrease the problems of streaking and enhance antifog characteristics when employed to clean windows, mirrors and other reflective surfaces. Dust repelling properties may also be found due to the nature of the cleaned surface.

The above benefits and advantages are obtained by adding about 0.03 to 2 weight percent of a soluble polymeric salt to a solution of about 0.01 to 5 weight percent of a nonionic or anionic surfactant in water, a water miscible alcohol, a water miscible glycol ether or mixtures thereof.

The polymeric salt is a copolymer of 1 to 2 moles of a monovinyl aromatic monomer per mole of an unsaturated dicarboxylic acid or an anhydride thereof wherein said acid is neutralized with a sufficient amount of an amine, ammonia or an alkali metal base to form a solubilizing salt group or wherein said anhydride is neutralized by a sufficient amount of ammonia or a monoamine having no other groups reactive with an anhydride group to form a solubilizing salt group.

DESCRIPTION OF THE INVENTION

At first glance it would appear a simple matter to formulate a window cleaner using most any type of surfactant. Yet it has proven more difficult than it appears to be to formulate a cleaner which not only cleans well but does not streak and which desirably impart non-fogging characteristics to the cleaned surface. The difficulty is increased by the need for a product which can be priced low enough to compete in the mass consumer market and by the subjective nature of these desirable properties which makes it difficult to devise tests to measure them.

The cleaning formulations of this invention have been shown by consumer panel tests, the most indicative way to test such products, to be effective window cleaners having the above desirable attributes. While for convenience the formulations of this invention will frequently be referred to as window cleaners, it is to be understood the formulations may also be used to clean mirrors, other glass surfaces, metallic and other reflective surfaces.

Any nonionic or anionic water soluble surfactant may be employed as the surfactant component of the formulations of this invention. At least about 0.01 weight percent of surfactant and up to about 5 weight percent may be used, preferably about 0.05 to 2 weight percent. While larger amounts of surfactant may be used, usually there is no advantage in doing so and frequently there are disadvantages when the above proportions are exceeded. The choice of an appropriate surfactant will be obvious to those skilled in the art in view of the multitude of nonionic and anionic surfactants available commercially and fully described in the art. It is not seen to be necessary herein for an elaborate discussion of all surfactants within these broad classes.

There may be mentioned, to illustrate these broad classes, such surfactants as: sulfonated fatty or "oxo" alcohols having about 5 to 18 carbon atoms; alkyl aryl sulfonates; sulfated fatty oils or esters; polyethylene oxide condensates of a variety of hydrophobic materials having at least one reactive hydrogen, e.g., fatty alcohols, fatty acids, fatty amides, alkyl phenols, polypropylene oxide and like hydrophobic groups, wherein the moles of ethylene oxide condensed per reactive hydrogen may vary from as few as 2 or 3 up to as many as 100.

Specific surfactants would include such materials as dodecyl sulfonate as the sodium salt, amine salt or alkanol amine salt; sulfated polyethylenoxide condensate of nonyl phenol in various salt forms; sodium lauryl sulfate; dioctyl sodium sulfosuccinate (better known as Aerosol OT); sodium N-methyl-N-decyl taurate (Igepon T-43); linoleic alkanolamide; Hyonic LA45, a fatty acid alkylolamide; Retzanol CO20, polyoxyethylene glyceride esters: Igepal AF710, an oxyethylated aliphatic alcohol; and the like. Descriptions of the above surfactants may be found in J. W. McCutcheon's catalogue, "Detergents and Emulsifiers."

Fatty acid sodium soaps are not sufficiently soluble in water to be useful and generally produce turbid solutions. Additionally, sodium soaps are absorbed and are rapidly affected by acidic gases in the air, e.g., carbon dioxide or sulfur dioxide, which soon results in a worse condition than originally since a free fatty acid will promote fog formation rather than prevent it.

The improvement in window cleaners and like formulations described herein depends on the incorporation in the formulation of about 0.03 to 2, preferably about 0.05 to 0.15, weight percent of a compatible, soluble polymeric salt. Generally, best results appear to be obtained at about a 0.1 weight percent level.

Soluble polymeric salts may be obtained by neutralizing copolymers of 1 to 2 moles of a monovinyl aromatic monomer per mole of an unsaturated dicarboxylic acid or anhydride thereof to form solubilizing salt groups. Preferably the copolymer is an equal molar copolymer.

Solubilizing salt groups include half-amide salts formed from the neutralization (interaction) of the anhydride group with ammonia or with a monoamine having at least one hydrogen attached to the amine nitrogen and having no other groups reactive with an anhydride. Neutralization of the unsaturated dicarboxylic acid copolymers with an alkali metal, ammonia or an amine produces carboxylate solubilizing groups

by a simple acid-base reaction where X is a positively charged ion which may be an alkali metal ion such as sodium or potassium, an ammonium ion or a substituted ammonium ion.

The neutralization of the anhydride group may be illustrated by the reaction of ammonia with a maleic anhydride copolymer (showing only the anhydride unit of the copolymer).

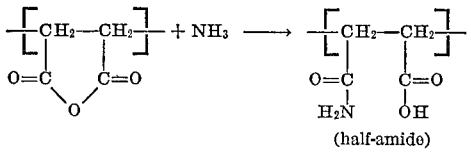

(half-amide)

The half-amide may be further neutralized by further reaction with ammonia or another base to form a half-amide salt,

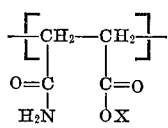

where X is the same as above. An N-substituted half-amide salt is formed when said amine is used in place of the ammonia.

By a soluble polymeric salt it is meant to include any of the unsaturated dicarboxylic acid or anhydride copolymer neutralization products which contain a sufficient number of salt groups to render said copolymers soluble in the concentrations employed. It is to be understood that complete neutralization of all the acid groups or anhydride groups may not be required to obtain the desired solubility.

Any primary or secondary monoamine may be employed to neutralize the anhydride copolymers provided the amine has no other group reactive with an anhydride and providing it forms a salt group capable of solubilizing the copolymer. While a variety of aliphatic, cycloaliphatic, heterocyclic and like amines may be employed certain amines are preferred from the human toxicity and handling standpoint, since the products are principally intended for use by humans, and from the availability and cost standpoint. The lower alkyl amines such as diethylamine, dimethylamine and the like are frequently used.

Alkali metal bases include hydroxides of sodium, potassium, lithium or the corresponding carbonates, bicarbonates, etc. Ammonium hydroxide is the usual form of ammonia employed. Any amine may be used provided it forms a carboxylate salt group capable of solubilizing the polymer. Certain amines are preferred for the previously stated reasons. Ammonia and alkanol amines are preferred neutralizing bases since in formulations such as window cleaners an excess of the base can be tolerated and frequently is quite desirable. Typical amines for forming substituted ammonium ion-carboxylate salt groups include the mono-, di-, and tri-alkyl amines (trimethyl amine, diethyl amine, isopropyl amine, etc.); mono-, di- and tri-alkanol amines (triethanol amine, diisopropanol amine, monoethanol amine, etc.); cycloaliphatic amines such as cyclohexylamine; heterocyclic amines such as morpholine; and like amines.

For complete neutralization of the copolymers at least about 2 moles of base per mole unit of dicarboxylic acid or anhydride is required. As indicated complete neutralization is not always needed and in many cases excess base is beneficial.

The copolymers themselves and their methods of preparation are well known to the art and need no detailed description herein. Briefly one widely used method is to prepare the polymers by solution polymerization employing a solvent which is a solvent for both the monomers and the polymer. Suitable free radical catalysts such as benzoyl peroxide may be used to initiate the polymerization which can be run over a wide temperature range. The monomers tend to polymerize readily in equal molar proportions. U.S. 3,336,267 discloses how to make nonequal molar copolymers. A variety of other patents disclose methods of polymerization by batch or continuous techniques or to produce low molecular weight or high molecular weight copolymers. It is also taught to employ solvents such as the aromatic solvents which are solvents for the monomer only. Other patents which may be consulted include Re. 23,514; U.S. 2,606,891; U.S. 2,675,370; U.S. 2,838,475; U.S. 2,971,939; U.S. 3,178,395; and U.S. 3,418,292.

The molecular weight of the copolymers may vary quite widely from about one or two thousand up to as high as two million or more with a preference indicated for copolymers from the lower molecular weight range when aerosol formulations are prepared and for higher molecular weight polymers in other formulations since they appear to give more improvement to the formulations.

Monomers which may be used to prepare said copolymers include unsaturated dicarboxylic acids such as maleic acid, chloromaleic acid, fumaric acid, itaconic acid, citraconic acid, phenylmaleic acid, aconitic acid and the like. Any of the anhydrides of said unsaturated acids may be employed. Aromatic monomers include styrene, α-methyl styrene, vinyl toluene, t-butyl styrene and similar well known monomers. Preferred copolymers are styrene-maleic anhydride or styrene-maleic acid.

Solvents for the formulations include water, water miscible lower alcohols, water miscible glycol ethers or various mixtures thereof. Said alcohols and glycol ethers have the additional desirable benefits of improving the removal of greasy substance and controlling the evaporation rate. The latter is of special importance when a large surface area is to be cleaned since it is undesirable if the formulation dries too rapidly. Commonly used alcohols are ethyl, methyl, isopropyl and like alcohols; one or more of the glycol ethers such as the ethyl ether of diethylene glycol or propylene glycol, or the analogous methyl, isopropyl, butyl etc. monoethers of such glycols.

Certain other materials may be added to the formulations herein without departing from the scope of the invention. To improve the cleaning ability, such as to remove grease and oil, small amounts up to no more than 10% of inorganic alkaline materials may be employed provided they are compatible with the formulation. Large amounts of such materials should be avoided since they leave residues and cause streaking. Typical of such alkaline materials are borax, sodium polyphosphates and the like. Organic alkaline materials may also be used for this purpose such as alkanolamines and ammonium hydroxide in excess of that needed to neutralize the polymer. It is preferred to use volatile materials since they do not leave a residue on the cleaned surface.

Additionally, chelating agents may be employed or materials to improve the antifog properties such as the various organosiloxane-oxyalkylene compounds (silicone glycols) and polysiloxanes (silicones). The silicone glycols are siloxane-oxyalkylene block copolymers, such as dimethylsiloxane-ethylene and/or propylene oxide block copolymers, which are fully described in U.S. 2,834,748. Generally 0.1 to 5 weight percent of such silicone-glycols are effective.

The formulations may be applied simply as a solution by wiping it on the surface to be cleaned, or the container may also have an atomizer attachment for spraying on the surface. The formulation may also be packaged as an aerosol employing a fluorocarbon, hydrocarbon or the like as a propellant.

The following non-limiting examples will further illustrate the invention. All parts and percentages are by weight unless otherwise specified.

EXAMPLE 1

A series of screening tests were run in which a sample of about 0.1 grams of the formulation is placed on a 3" x 5" mirror and then spread lightly over the entire surface of the mirror using a clean, dry paper towel. The product may either be wiped to dryness and the amount of streaking determined qualitatively or it can be allowed to air dry. In the latter case differences in products may be ascertained by either the total number of spots remaining or the size of the spots. To test antifog protection the experimenter exhales on the mirror and observes the amount of fogging.

Antifog was also tested by placing the mirror in a small plexiglass chamber. Cooling coils beneath the chamber keep the floor at a constant temperature of about 60° F. A dish of hot water is placed in the chamber and the amount of fogging by the mirrors observed.

Yet another test employed involved placing the mirror in a humidity chamber maintained at 98° F. and 100% relative humidity and fogging observed.

Another more practical test involved actual use on a bathroom mirror. After first cleaning with a mixture of isopropanol and water, a sample of the formulation to be tested was sprayed on the mirror and wiped off as a housewife would do. The shower was then turned on and steam allowed to accumulate in the room and fogging characteristics evaluated.

Using the above tests, formulations containing 0.1% of an equimolar copolymer of styrene-maleic anhydride (4 cps.) which was first hydrolyzed to the maleic acid form and was then neutralized with 2 moles of diethanolamine per mole of anhydride (di-acid) and 0.1 to 0.3% of various surfactants were tested. Less streaking was found in all cases and improved antifogging was found with the following surfactants compared to a formulation of the surfactant only.

dioctyl sodium sulfosuccinate (Aerosol OT)
polyethylene glycol ether of linear alcohol (Tergitol 15S7)
sulfosuccinate ester (Soleterge 9)
sodium lauryl sulfate (Sipon ESY and ES)
diethanol amine lauryl sulfate (Conco Sulphate EP)
ammonium lauryl sulfate (Conco Sulphate A)
dodecyl benzene sulfonate (Conco AAS 98S)
modified amine dodecyl benzene sulfonate (Conco AAS Special No. 3)
alkanolamide of linoleic acid (Foamole A and L)
ammonium salt of sulfated alkyl phenol polyglycol ether (Neutronyx 560)
alkanolamine salt of alkyl aryl sulfonic acid (Schercoterge TDS)

Similar results to the above were found when the styrene maleic anhydride molar ratio was varied from 1:1 to 2:1. Higher molar ratios were not found to be effective.

Various salt forms of the above copolymers were evaluated including the half amide ammonium salts and the di-salts of ammonia, monoethanolamine, diethanolamine, and thriethanolamine. All the salt forms were about equivalent in improving antifog properties but the ethanol amine salts gave the best results on decreasing streaking. The proportions were also varied from about one mole of base per mole of anhydride to 2:1 with diethanol amine and essentially no differences were found. The molecular weight of the polymer was varied from as low as 4,000 up to as high as two million giving good results.

EXAMPLE 2

The effectiveness of the polymeric salt in enhancing the antifog properties of the surfactant Aerosol OT was determined employing an equimolar copolymer of styrene-maleic acid reacted with two moles of diethanol amine per mole of maleic acid having a viscosity of about 39 cps. (approximately 450,000 M.W.) in one case and about 20 cps. (approximately 320,000 M.W.) in a second case.

|  | Polymer, cps. | Percent OT | Anti-fog results |
|---|---|---|---|
| Percent polymer: |  |  |  |
| 0.0 |  | 0.0 | Poor. |
| 0.0 |  | 0.5 | Fair. |
| 0.0 |  | 0.6 | Good. |
| 0.0 |  | 0.8 | Excellent. |
| 0.05 | 39 | 0.0 | Poor. |
| 0.05 | 39 | 0.2 | Good. |
| 0.05 | 39 | 0.5 | Excellent. |
| 0.1 | 39 | 0.0 | Fair. |
| 0.1 | 39 | 0.1 | Good. |
| 0.1 | 39 | 0.5 | Excellent. |
| 0.1 | 20 | 0.2 | Good. |
| 0.1 | 20 | 0.4 | Do. |
| 0.15 | 39 | 0.0 | Fair. |
| 0.15 | 39 | 0.2 | Excellent. |
| 0.15 | 20 | 0.2 | Do. |
| 0.15 | 20 | 0.4 | Do. |
| 0.2 | 20 | 0.2 | Good. |
| 0.2 | 20 | 0.4 | Excellent. |

The above results show that the polymeric salt provides improved anti-fog properties at lower surfactant concentrations than when the surfactant is used alone.

EXAMPLE 3

To further verify the above results several consumer panel tests were run in which the panelists had no knowledge of which formulation they were using. The panelists, on using these fomulations under actual household conditions, then rated the formulation they were using as to cleaning ability, wiping, streaking and film formation (evidence of a residual film).

In one test the control formulation contained 0.8% of Aerosol OT and the comparison formulation contained 0.1% of the 20 cps. polymeric salt of Example 2 and 0.5% Aerosol OT. The results are summarized below where a higher number indicates a consumer preference for the product.

|  | Formulation of this invention | Control |
|---|---|---|
| Cleaning | 43 | 33 |
| Wiping | 22 | 5 |
| Streaking | 44 | 32 |
| Film formation | 33 | 17 |

In another test a formulation containing 0.1% of the 20 cps. polymeric salt of Example 2 and 0.7% of dodecyl benzene sodium sulfate (Calsoft F90) was compared to a control formulation containing 0.8% Aerosol OT with the following results.

|  | Formulation of this invention | Control |
|---|---|---|
| Cleaning | 50 | 32 |
| Wiping | 32 | 3 |
| Streaking | 45 | 12 |
| Film formation | 32 | −6 |

The cumulative results of a number of other similar panel tests where the polymer salt concentration ranged from 0.1 to 0.15% and the surfactant from 0.5 to 0.8% are shown below.

|  | Formulation of this invention | Control |
|---|---|---|
| Cleaning | 50 | 32 |
| Wiping | 32 | 15 |
| Streaking | 52 | 15 |
| Film formation | 43 | 6 |

The superiority and consumer preference for formulations of this invention are consistently demonstrated by the above results.

EXAMPLE 4

Consumer preference was also shown for formulations of this invention over one of the leading window cleaner household products employing formulations similar to Example 3.

|  | Formulation of this invention | Competitive product |
|---|---|---|
| Cleaning | 42 | 38 |
| Wiping | 41 | 27 |
| Streaking | 41 | 23 |
| Film formation | 41 | 41 |

EXAMPLE 5

An effective formulation having all the above desired characteristics comprises:

5% isopropanol
5% n-butyl monoether ethylene glycol (Dowanol EB)
1% dodecylbenzene sulfonate (sodium)
0.1% polymeric salt similar to Example 1
q.s. deionized water.

It has been found preferable to make the formulations using deionized water.

What is claimed is:

1. A cleaning formulation for glass and reflective surfaces comprising a compatible solution in water, a water miscible lower alcohol, a water miscible glycol ether or mixtures thereof of (a) from about 0.03 to 2 weight percent of a soluble polymeric salt; and
(b) from about 0.01 to 5 weight percent of an anionic sulfonate or sulfate surfactant;

said polymeric salt being a copolymer of 1 to 2 moles of a monovinyl aromatic monomer per mole of an unsaturated dicarboxylic acid or anhydride thereof neutralized with a sufficient amount of ammonia, an alkali metal base or an amine to form solubilizing salt groups.

2. The cleaning formulation of claim 1 further containing from about 0.1 to 5 weight percent of a silicone glycol.

3. The cleaning formulation of claim 1 wherein said copolymer is a copolymer of styrene and maleic anhydride or of styrene and maleic acid.

4. The cleaning formulation of claim 3 wherein said copolymers are equimolar copolymers.

5. The cleaning formulation of claim 1 wherein said base is an alkanolamine and said copolymer is styrene-maleic acid.

6. The cleaning formulation of claim 1 wherein said anionic surfactant is a sulfonate.

7. The cleaning formulation of claim 1 wherein the concentration of said polymeric salt ranges from about 0.05 to 0.15 weight percent.

8. The cleaning formulation of claim 1 wherein the concentration of said surfactant ranges from about 0.05 to 2 weight percent.

References Cited

UNITED STATES PATENTS

| 2,876,201 | 3/1959 | Feldmann | 252—541 X |
| 3,342,740 | 9/1967 | Kazmierczak et al. | 252—153 |
| 3,485,762 | 12/1969 | Gower et al. | 252—541 |
| 2,943,058 | 6/1960 | Cook | 252—153 |

RICHARD D. LOVERING, Primary Examiner

U.S. Cl. X.R.

106—13; 134—6; 252—90, 139, 527, 546, DIG. 1, DIG. 2, DIG. 10